3,576,925
METHOD OF PREPARING FUEL PLATES FOR A NUCLEAR REACTOR

Joseph H. Handwerk, Joliet, Joseph T. Dusek, Downers Grove, and George D. White, Joliet, Ill., assignors to the United States of America as represented by the United States Atomic Energy Commission
No Drawing. Filed May 2, 1968, Ser. No. 726,243
Int. Cl. G21c 21/00
U.S. Cl. 264—.5                            1 Claim

ABSTRACT OF THE DISCLOSURE

A process for fabricating large numbers of thin, flat fuel plates for use in a nuclear reactor. A plurality of such fuel plates are hot pressed simultaneously in a single-cavity graphite die using graphite spacers between the plates.

CONTRACTUAL ORIGIN OF THE INVENTION

The invention described herein was made in the course of or under, a contract with the United States Atomic Energy Commission.

BACKGROUND OF THE INVENTION

This invention relates to the formation of ceramic compacts. In more detail, the invention relates to the preparation of a large number of thin, flat plates for use as fuel in a nuclear reactor.

A substantial effort has gone into development of techniques for the preparation of ceramic pellets for use as fuel in a nuclear reactor. Cold pressing and sintering is the technique that has been used most widely up to this time. Other techniques on which work has been done include hydrostatic pressing, slip casting, extrusion pressing, vibration compaction and swaging. While acceptable results have been attained using these techniques for preparing small, cylindrical fuel pellets for existing reactors, none of these techniques are completely satisfactory for preparing a large quantity of thin, flat ceramic plates— of the nature of ceramic tile—such as are expected to be used as fuel in the Zero Power Plutonium Reactor (ZPPR). This reactor will require thousands of plates which are square in shape, about 5 cm. on a side and about 0.5 cm. thick and contain mixed uranium and plutonium dioxides compressed to a density of 85–87% of theoretical. In particular, cold pressing and sintering is not completely satisfactory because it is difficult to obtain a pressed compact of completely uniform thickness and density. This may result in warpage of the tile. In sintering the tile some distortion is likely to be encountered due to temperature variations in the furnace and the non-uniform pressed density. In addition, it is difficult to hold the density of the sintered tile within the required limits, since a higher density is normally obtained by sintering.

Another technique that is available for fabricating ceramic compacts is hot pressing. Hot pressing is a fabrication technique involving the simultaneous application of heat and pressure to a powder charge within a graphite die. Temperatures of up to 1630° C. and pressures of up to the compressive strength of the graphite can be used. While hot pressing of one ceramic compact at a time— or a plurality of compacts each in a separate cavity in a multiple-cavity die—has been demonstrated to provide excellent results, it has not been thought practical to prepare a large number of such compacts by hot pressing due to the time required to heat the die up and cool it down each time a single compact is prepared. It has been felt that it would not be possible to hot press a number of compacts within a single-cavity die and retain adequate quality control.

It is accordingly an object of the present invention to develop a process for fabricating a plurality of ceramic compacts simultaneously.

It is a more detailed object of the present invention to develop a method of preparing a plurality of fuel plates of uranium dioxide or uranium dioxide-plutonium dioxide simultaneously, which plates conform closely to required dimensions and density.

SUMMARY OF THE INVENTION

These and other objects of the present invention are attained by successively adding accurately weighed increments of ceramic powder to a vertical graphite die, leveling each increment, inserting a thin graphite spacer between each of said increments, if desired, placing a paper liner on both sides of the spacer, heating to a temperature of between 1400 and 1630° C. while pressing at a pressure of from 4000 p.s.i. up to a limit set by the compressive strength of graphite (about 8000 p.s.i.), whereby a plurality of ceramic plates of uniform density and thickness are obtained.

DESCRIPTION OF A SPECIFIC EMBODIMENT OF THE INVENTION

The hot press apparatus used consisted of an induction heated furnace mounted in a hydraulic press. However, a graphite resistor furnace could also be used. Pressure and power were regulated manually and the temperature was measured by means of an optical pyrometer. Argon was used to blanket the die assembly in some runs.

The die-susceptor assembly, punches and spacers were machined from both CS and ATJ grades of graphite. Of the two grades, CS is softer, coarser grained, and has lower strength than the ATJ. The higher strength graphite is preferred because it gives a smoother surface and there is less carbon contamination. Liners made of filter paper were used in the punch and on the spacer faces to reduce sticking. While desirable, it is not believed that use of the liners is essential.

In the initial series of tests, five specimens per pressing were chosen because this number provides a specimen at the center of the stack. Thus the specimens could be evaluated in relation to position, and the results would have meaning if the number of specimens per pressing were increased.

The ceramic grade uranium dioxide was supplied by a commercial vendor. Oxygen-to-uranium was 2.13, determined by oxidizing to $U_3O_8$; fluorine content was 100 p.p.m.; and Fisher average particle size was $1.3\mu$.

The procedure for loading the die was as follows. The bottom plunger was inserted into the mold leaving a cavity depth of ¾ inch. The unarium dioxide powder was charged into the cavity over a paper liner used to alleviate strain on the compacts. After the powder was leveled, a paper liner and a graphite spacer were inserted and a 550 kg. load was applied to force the composite down to a level so another composite could be formed. This procedure was repeated until sufficient powder had been charged for the number of specimens desired. A final load of 820 kg. was applied to the assembly before placing it in the hot press furnace. The initial pressure in the furnace was slight, but it was increased with time and temperature. In a typical cycle the temperature and pressure were increased gradually for the first 90 minutes to 1625° C. and 112 kg./cm.², after which time the temperature was held steady for 80 minutes while the pressure was slightly increased to 130 kg./cm.². In this series of runs uranium dioxide discs 4.22 cm. in diameter and 0.51 cm. thick were prepared. In one instance, 11 compacts were hot pressed at the same time. In subsequent tests square plates 5.08 cm. x 5.08 cm. x 0.51 cm. were prepared.

Geometric densities were determined on each of the specimens. Thicknesses were the averages of five determination and the diameters of two. Table I lists densities as a function of stack positions for a pressing at 1625° C. Average densities for pressings at the three temperatures are shown in Table II.

TABLE I

Density versus position in stack

| Position: | Density (percent theoretical) |
| --- | --- |
| Bottom: | |
| 1 | 87.97 |
| 2 | 88.61 |
| 3 | 88.97 |
| 4 | 89.61 |
| Top: | |
| 5 | 89.24 |

TABLE II

Average density versus temperature

| Temp. (° C.): | Density (percent theoretical) |
| --- | --- |
| 1400 | 76.21 |
| 1500 | 81.40 |
| 1625 | 88.88 |

In these experiments, the density profile of specimens in the stack was skewed toward the top. Other pressings at 1625° C. had a density spread and profile similar to the one listed. A single pressing of eleven specimens at 1625° C. produced a density spread similar to the spread observed in one of the five specimen stacks. Although the densities of pressings at 1400 and 1500° C. were below the range of interest, they were within a stack similar to those at 1625° C. Later experiments in which a double action press was used show no directional influence in the density profile. On square tile, density variations within a five-tile stack have been about ±0.65%.

The diameter of specimens was determined by the die. Consequently, very little variation of this dimension was observed. The thickness, however, was a function of powder weight, uniformity of loading, and ultimate density achieved. The standard deviations of thicknesses for specimens pressed at the three temperatures are listed in Table III.

TABLE III.—THICKNESS STANDARD DEVIATIONS

| Temp. (° C.) | Standard deviation (cm.) | Relative standard deviation (percent) |
| --- | --- | --- |
| 1,400 | 0.008 | 1.2 |
| 1,500 | 0.010 | 1.8 |
| 1,625 | 0.008 | 1.4 |

If the ultimate density at 1625° C. is known, the thickness can be controlled within 1.4% by accurately weighing the powder and pressing it down to the desired point within the die. According to a preferred embodiment, the pressure employed was 4000–4500 p.s.i., the temperature was 1550–1625° C., and the time was 8 minutes to produce uranium dioxide compacts. The advantage of hot pressing is that dimensional control is easily achieved by measuring the amount of press movement. This measurement will control the thickness of the pressed plates, while the die size will control the length and width of the tile. Since the volume of the tile is controlled, any density within reason can be produced. Thus, the production of low-density tile will not be a problem. Hot pressing is feasible because a plurality of plates can be pressed simultaneously.

It will be understood that the invention is not to be limited to the details given herein but that it may be modified within the scope of the appended claim.

The embodiments of the invention in which an exclusive property or privilege is claimed are defined as follows:

1. A method of making a large number of fuel plates for a nuclear reactor simultaneously comprising successively adding accurately weighed increments of urania or mixed uranium dioxide-plutonium dioxide powder to a graphite die which is oriented vertically, leveling the powder after each said addition, inserting a graphite spacer between each increment, compressing each increment to a sufficient extent so as to permit the addition of the entire charge to the die, applying a load of 820 kg. to the charge, placing the charge in a hot press furnace, increasing the temperature and pressure gradually for 90 minutes to 1625° C. and 112 kg./cm.$^2$, and holding the temperature steady for 80 minutes while increasing the pressure to 130 kg./cm.$^2$, thereby attaining a uniform density and uniform thickness in all fuel plates.

References Cited

UNITED STATES PATENTS

| 2,950,238 | 8/1960 | Nicholson | 264—0.5X |
| 3,116,137 | 12/1963 | Vasilos et al. | 264—332X |
| 3,198,856 | 8/1965 | Hammond et al. | 264—0.5 |

CARL D. QUARFORTH, Primary Examiner

S. R. HELLMAN, Assistant Examiner

U.S. Cl. X.R.

264—58, 332